US009536408B2

(12) United States Patent
Pinder

(10) Patent No.: US 9,536,408 B2
(45) Date of Patent: Jan. 3, 2017

(54) PROGRAMMABLE PROXIMITY ALERT SYSTEM FOR CHILD IN VEHICLE

(71) Applicant: Sofia Pinder, West Columbia, SC (US)

(72) Inventor: Sofia Pinder, West Columbia, SC (US)

( * ) Notice: Subject to any disclaimer, the term of this patent is extended or adjusted under 35 U.S.C. 154(b) by 0 days.

(21) Appl. No.: 14/599,813

(22) Filed: Jan. 19, 2015

(65) Prior Publication Data

US 2016/0210833 A1 Jul. 21, 2016

(51) Int. Cl.
*G08B 21/00* (2006.01)
*G08B 21/02* (2006.01)

(52) U.S. Cl.
CPC ........... *G08B 21/02* (2013.01); *G08B 21/0202* (2013.01); *G08B 21/0205* (2013.01)

(58) Field of Classification Search
CPC . G08B 21/0202; G08B 21/0205; G08B 21/02; G08B 21/0227; G08B 21/0236; G08B 21/028; G08B 21/0288; G08B 21/0294; G08B 13/1427; G08B 5/00
See application file for complete search history.

(56) References Cited

U.S. PATENT DOCUMENTS 5,646,593 A * 7/1997 Hughes .............. G08B 21/0222 340/539.1
6,563,427 B2 5/2003 Bero
8,058,983 B1 * 11/2011 Davisson ........... G08B 21/0205 340/10.1
8,659,414 B1 2/2014 Schuk
2003/0122662 A1 7/2003 Quinonez
2005/0099285 A1 5/2005 Prevatt
2005/0280546 A1 * 12/2005 Ganley ............. G08B 13/1427 340/573.4
2006/0103516 A1 5/2006 Zang
2006/0208911 A1 9/2006 Davis
2006/0250255 A1 11/2006 Flanagan
2013/0033373 A1 2/2013 Thomas
2015/0187197 A1 * 7/2015 Golomb ............ G08B 21/0205 340/686.1
2015/0274036 A1 * 10/2015 Arad ...................... B60N 2/002 340/573.1

* cited by examiner

*Primary Examiner* — Van Trieu

(74) *Attorney, Agent, or Firm* — The Keys Law Firm PLLC

(57) ABSTRACT

A programmable proximity alert system for providing a sensory reminder to a parent when the exit the vicinity of a vehicle possibly containing their child. The programmable proximity alert system comprises a remote receiver adapted to sense the presence of a seat transmitter that it has been paired with and provide plural sensor alerts upon exiting from within a predetermined proximity of the seat transmitter, as well as a coding remote for initiating a bonding request that pairs a remote receiver and a seat transmitter.

7 Claims, 2 Drawing Sheets

130
132
1 2 3 4 5 6 7 8 9 0
131
150

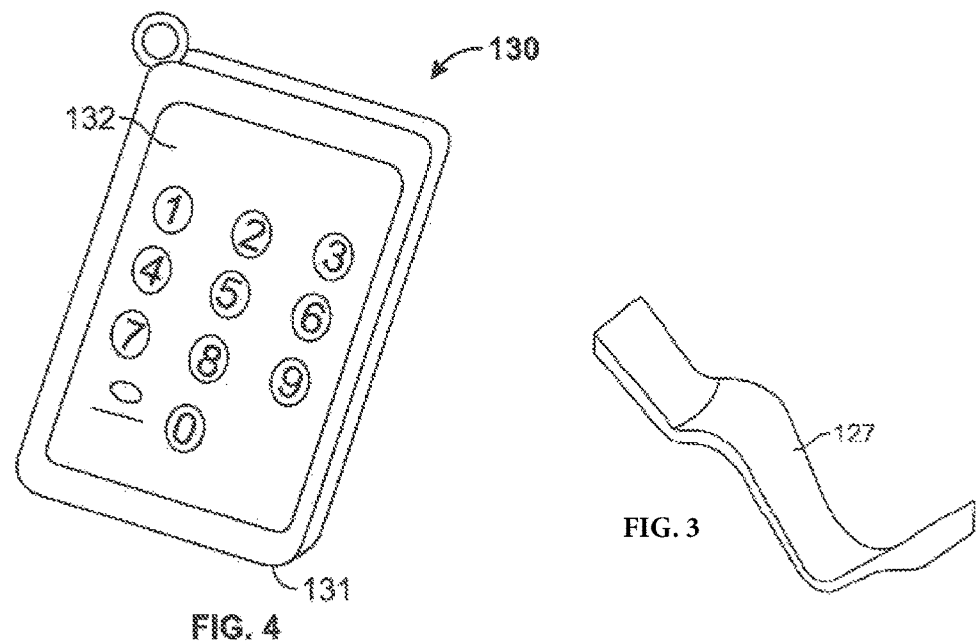
FIG. 4
FIG. 3
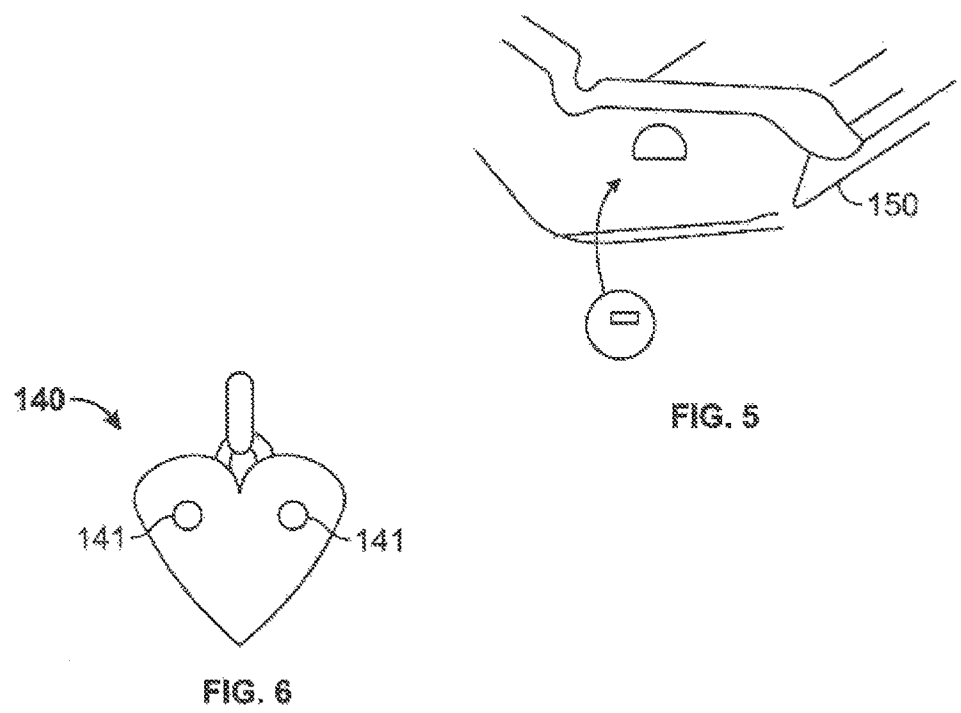
FIG. 5
FIG. 6

PROGRAMMABLE PROXIMITY ALERT SYSTEM FOR CHILD IN VEHICLE

BACKGROUND OF THE INVENTION

1. Field of the Invention

This invention relates generally to alarm indicators and, more particularly, to a programmable alert system that alerts a parent when they exit a predetermined proximity from a child in a car.

2. Description of the Prior Art

The use of proximity sensing equipment to detect or monitor the presence of nearby objects without any physical contact is well known. There remains a need for a programmable proximity alert system for use in a vehicle that informs a parent or caregiver (collectively herein, a "parent") when they may have left a baby or child (collectively herein, a "child") in the vehicle. It would be helpful if such a programmable proximity alert system was configured to generate plural sensory alerts whenever it exits the nominal range of a vehicle seat transmitter. It would be additionally desirable for such a programmable proximity alert system to utilize a discrete coding remote that facilitates the pairing of any number of remote receivers and seat transmitters so as to alleviate the need for a parent to switch out various remote receivers and seat transmitters depending on the parent accompanying the child or the vehicle used.

The Applicant's invention described herein provides for a programmable proximity alert system adapted to generate multiple sensor alerts whenever a parent exits a predetermined proximity from their vehicle. The primary components in Applicant's programmable proximity alert system are a remote receiver, seat transmitter, and a coding remote. When in operation, the programmable proximity alert system provides an automatic reminder to parents to get their child every time they move out the a close proximity to their vehicle. As a result, instances wherein a child or children are left in a vehicle by a negligent or absentminded parent can be avoided.

SUMMARY OF THE INVENTION

A programmable proximity alert system for providing a sensory reminder to a parent when the exit the vicinity of a vehicle possibly containing their child. The programmable proximity alert system comprises a remote receiver adapted to sense the presence of a seat transmitter that it has been paired with and provide plural sensor alerts upon exiting from within a predetermined proximity of the seat transmitter, as well as a coding remote for initiating a bonding request that pairs a remote receiver and a seat transmitter. In this regard, the remote receiver provides a receiver means for sensing proximity and producing sensory alerts, the seat transmitter provides a transmitter means for establishing a monitoring point, and the coding remote provides a coding means for bonding the remote receiver and the seat transmitter.

It is an object of this invention to provide a programmable proximity alert system for use in a vehicle that informs a parent when they may have left a child in the vehicle.

It is another object of this invention to provide a programmable proximity alert system configured to generate plural sensory alerts whenever it exits the nominal range of a vehicle seat transmitter.

It is yet another object of this invention to provide a programmable proximity alert system that utilizes a discrete coding remote that facilitates the pairing of any number of remote receivers and seat transmitters so as to alleviate the need for a parent to switch out various remote receivers and seat transmitters depending on the parent accompanying the child or the vehicle used.

These and other objects will be apparent to one of skill in the art.

BRIEF DESCRIPTION OF THE DRAWINGS

FIG. 3 is a front perspective view of the fastening strap of a programmable proximity alert system built in accordance with the present invention.

FIG. 4 is a front perspective view of the coding remote of a programmable proximity alert system built in accordance with the present invention.

FIG. 5 is a side perspective view of the vehicle seat transmitter of a programmable proximity alert system built in accordance with the present invention with a convention vehicle seat.

FIG. 6 is a front elevational view of the charm receiver of a programmable proximity alert system built in accordance with the present invention.

DETAILED DESCRIPTION OF THE INVENTION

Figure 1A:
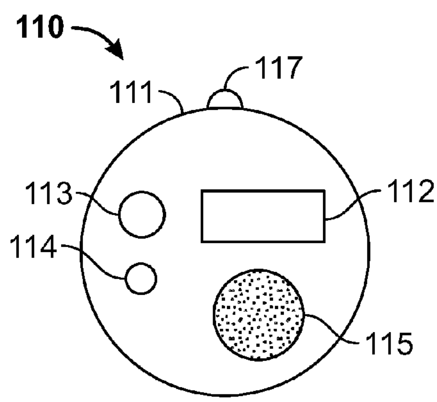
FIG. 1A is a front elevational view of the remote receiver of a programmable proximity alert system built in accordance with the present invention.
Figure 1B:
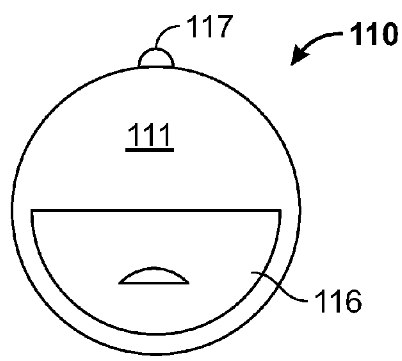
FIG. 1B is a back elevational view of the remote receiver of a programmable proximity alert system built in accordance with the present invention.
Figure 1C:
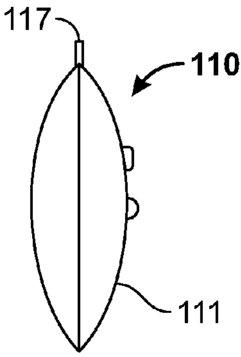
FIG. 1C is a side elevational view of the remote receiver of a programmable proximity alert system built in accordance with the present invention.
Figure 2A:
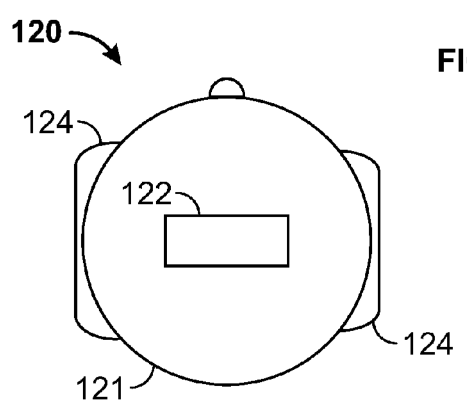
FIG. 2A is a front elevational view of the vehicle seat transmitter of a programmable proximity alert system built in accordance with the present invention.
Figure 2B:
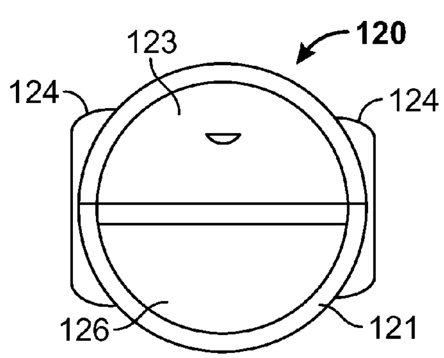
FIG. 2B is a back elevational view of the vehicle seat transmitter of a programmable proximity alert system built in accordance with the present invention.
Figure 2C:
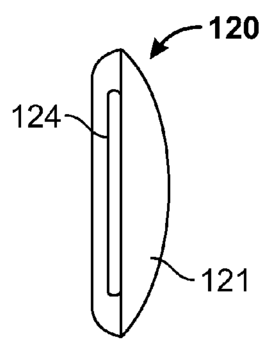
FIG. 2C is a side elevational view of the vehicle seat transmitter of a programmable proximity alert system built in accordance with the present invention.

Referring now to the drawings and in particular FIGS. 1A, 1B, and 1C, a remote receiver 110 of a programmable proximity alert system is shown having a receiver housing 111 that includes a display screen 112, a light indicator 113, a reset button 114, a speaker 115, a removable battery door 116, and an attachment loop 117. Inside the receiver housing 111 is an RF antenna, a processor, non-volatile memory, and a battery unit. The internal components are electrically connected with each other and the display screen 112, light indicator 113, reset button 114, and speaker 115, thereby enabling the integrated operation of all of the electrical components.

In the preferred embodiment, the display screen 112 defines an LCD display configured to display visual alerts in the form of words or phrases, the light indicator 113 is configured to illuminate in either red or green, the reset button 114 is configured to reset an alarm condition that has been triggered by the RF antenna, and the speaker 115 defines a buzzer that is configured to broadcast audible alerts. The removable battery door 116 provides selective access to the internal area of the housing 111, thereby enabling a user to replace the battery unit. The attachment loop 117 enables the housing to be connected to a chain or necklace so that it can be worn by a user when the programmable proximity alert system is in use.

Referring now to FIGS. 2A, 2B, 2C, and 3, a vehicle seat transmitter 120 of the programmable proximity alert system is shown having a transmitter housing 121 that includes a transmitter display 122, an attachment surface 123, a transmitter loop 124 disposed on either side of the transmitter housing 121, and a transmitter battery door 126. Inside the transmitter housing 121 is an RF antenna, a processor, non-volatile memory, and a battery unit. As with the remote receiver 110, the internal components of the seat transmitter 120 are electrically connected with each other and transmitter display 122, thereby enabling the integrated operation of all of the electrical components of the transmitter housing 121.

In the preferred embodiment, the transmitter display 122 defines an LCD display screen configured to display visual messages in the form of words or phrases. The transmitter battery door 126 defines a removable door that provides selective access to the internal area of the transmitter housing 121, thereby enabling a user to replace the battery unit. The attachment surface 123 defines a surface area for receiving a patch of hook and loop fastener material or adhesive material for enabling the transmitter housing 121 to be attached to a conventional vehicle seat when the programmable proximity alert system is in use. The transmitter loops 124 provide an interface for a hook and loop fastener strap 127, such as an arm band, to attach to the transmitter housing 121, enabling the transmitter housing 121 to be attached to the clothing of a child or adjacent a conventional vehicle seat when the programmable proximity alert system is in use.

Referring now to FIG. 4, a coding remote 130 is shown as a coding housing 131 having a keypad 132 disposed thereon. The coding remote 130 additionally includes an internal RF antenna, a processor, non-volatile memory, and a battery unit, all of which are interconnected with each other and the keypad.

Referring now to FIGS. 1A, 2A, 2B, 3, 4, and 5, in operation, the programmable proximity alert system is employed to alert users whenever they exit the proximity of a vehicle seat possible having a child therein by first pairing a remote receiver 110 with a seat transmitter 120 using a coding remote 130. In the preferred embodiment, the pairing process is accomplished through dedicated bonding that is initiated by the coding remote. More specifically, the RF antenna in each device defines a Bluetooth antenna and the memory on each device includes software containing instructions to facilitate the bonding of one or more remote receivers 110 with one or more seat transmitters 120. The RF antenna on each remote receiver 110 and seat transmitter 120 includes a unique identifier which is printed on the device's respective battery door 116, 126. When an unpaired remote receiver 110 and a seat transmitter 120 are turned on and within range of one another (approximately 10 meters in the preferred embodiment), along with a coding remote 130, the bonding process is accomplished by entering on the coding remote 130 the unique identifier of the remote receiver 110, then unique identifier of the seat transmitter 120, and then the unique identifier of the remote receiver 110 again. Once the remote receiver 110 and the seat transmitter 120 have been bonded, they remain bonded until the bonding relationship is removed by a user subsequently.

Through the bonding relationship, any time the remote receiver 110 and seat transmitter 120, when powered on, enter into a nominal range defined by when they are within a distance to one another where the remote receiver 110 picks up the seat transmitter's 120 wireless signal and the seat transmitter 120 picks up the remote receiver's 110 signal, the programmable proximity alert system becomes primed. While the programmable proximity alert system is primed, as long as the remote receiver 110 was in the nominal range of the seat transmitter 120, the transmitter display 122 would read SAFE.

In the event the remote receiver 110 exits the nominal range of the seat transmitter 120 in a primed programmable proximity alert system, an alert condition is generated on both the remote receiver 110 and the seat transmitter 120. On the remote receiver 110, the alert condition causes the display screen 112 to display the word CHILD, the light indicator 113 would flash red, and the speaker 115 would emit a buzzing sound until the reset button 114 was pressed or the remote receiver 110 again became within the nominal range of the seat transmitter 120. On the seat transmitter 120, the alert condition causes the transmitter display 122 to stop displaying SAFE.

It is contemplated that the seat transmitter 120 is desirably attached to a child directly or to a vehicle seat 150 in which a child is seated. Accordingly, the seat transmitter 120 may be fastened directly to a vehicle seat through an adhesive or hook and loop fastener material disposed directly on its surface on its attachment surface 123, or may be strapped to the seat 150 or the child directly with the hook and loop fastener strap 127 that has been looped through the transmitter loops 124.

Referring now to FIG. 6, in one embodiment, a charm receiver 140 is additionally employed as a wearable device that provides sensory alerts. The charm receiver 140 is constructed similar to the remote receiver except that it only includes indicator lights 141 and lacks the display screen and speakers. As such, the charm receiver 140 can be bonded with a seat transmitter in the same manner as the remote receiver and generate alerts conditions in substantially the same manner.

Advantageously, because remote receiver(s) and seat transmitters (and potentially charm receivers) are paired by the end user, multiple remote receivers can be paired with a seat transmitter (or vice versa). Accordingly, multiple parents can monitor the same child, or a parent's single remote receiver can be configured to operate with a seat transmitter in a first vehicle (when primed to do so) or a second vehicle (when primed to do so).

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A programmable proximity alert system, comprising:

a remote receiver defining a receiver housing that includes an electrically interconnected receiver RF antenna, receiver processor, receiver non-volatile memory, and receiver power source, wherein said remote receiver configured to generate and receive radio frequency transmissions and to produce at least one sensory alert upon the generation of an alert condition;

a seat transmitter defining a transmitter housing that includes an electrically interconnected transmitter RF antenna, transmitter processor, transmitter non-volatile memory, and transmitter power source, wherein said seat transmitter is configured to generate and receive radio frequency transmissions;

said remote receiver and seat transmitter adapted to be bonded such that in the event the remote receiver moves from within a nominal range of the seat transmitter to outside of the nominal range, said remote receiver generates an alert condition; and a coding remote defining a coding housing with an external keypad and an internal coding RF antenna, coding processor, coding non-volatile memory, and coding battery unit, wherein the coding remote is configured to generate and receive radio frequency transmissions and initiate the process by which said remote receiver and seat transmitter are bonded.

2. The programmable proximity alert system of claim 1, said remote receiver and seat transmitter additionally adapted to be bonded such that in the event said remote receiver generates an alert condition, once the remote receiver moves to within the nominal range of the seat transmitter or when a reset button on the remote receiver is pressed, any alert condition generated is terminated along with any sensory alert produced as a result of the alert condition.

3. The programmable proximity alert system of claim 1, additionally comprising a charm receiver configured to generate and receive radio frequency transmissions and to produce at least one sensory alert upon the generation of an alert condition upon at least one of the remote receiver and the charm receiver moves from within a nominal range of the seat transmitter to outside of the nominal range.

4. The programmable proximity alert system of claim 1, wherein said receiver housing includes a speaker and at least one of a display screen and a light indicator integrated therewith and electrically connected to the receiver processor and receiver power source and is operative to generate a visual alert on the at least one of display screen and light indicator and an audible alert on the speaker the generation of an alert condition.

5. The programmable proximity alert system of claim 4, wherein said receiver housing includes each of the display screen, light indicator, and speaker.

6. The programmable proximity alert system of claim 1, wherein said transmitter housing includes a transmitter display integrated therewith and electrically connected to the transmitter processor and transmitter power source and said transmitter display is operative to generate a visual message while the remote receiver is within the nominal range of the seat transmitter.

7. The programmable proximity alert system of claim 1, wherein the transmitter housing includes at least one of an attachment surface and transmitter loops.

* * * * *